United States Patent [19]

Koppelmann

[11] Patent Number: 4,475,852

[45] Date of Patent: Oct. 9, 1984

[54] RETRACTABLE ROTARY CUTTING TOOL

[75] Inventor: Eldo K. Koppelmann, Cumberland, R.I.

[73] Assignee: Santrade Ltd., Lucerne, Switzerland

[21] Appl. No.: 334,458

[22] Filed: Dec. 24, 1981

[51] Int. Cl.³ .............................................. B23B 51/00
[52] U.S. Cl. ...................................... 408/73; 408/187; 408/159; 408/180; 408/93
[58] Field of Search ...................... 408/73, 74, 93, 153, 408/158, 159, 179, 180, 146, 147, 187

[56] References Cited

U.S. PATENT DOCUMENTS

| | | | |
|---|---|---|---|
| 2,131,965 | 10/1938 | Nell | 408/158 |
| 2,438,558 | 3/1948 | Hollander | 408/154 |
| 2,663,203 | 12/1953 | Fried et al. | 408/154 |
| 2,773,402 | 12/1956 | Edens | 408/110 |
| 2,855,812 | 10/1958 | Fried | 408/159 |
| 2,959,109 | 11/1960 | Buchan | 408/187 |
| 3,008,360 | 11/1961 | Winberry, Jr. | 408/159 |
| 3,021,733 | 2/1962 | Cogsdill | 408/180 |
| 3,318,175 | 5/1967 | Cogsdill | 408/159 |
| 3,361,013 | 1/1968 | Vindez | 408/159 |
| 3,540,324 | 11/1970 | Johansson | 408/154 |
| 3,540,325 | 11/1970 | Artaud | 408/159 |
| 3,572,182 | 3/1971 | MacDonald | 408/154 |
| 3,806,271 | 4/1974 | Ishiguro et al. | 408/159 |
| 3,814,535 | 6/1974 | Steiner | 408/73 |
| 3,827,821 | 8/1974 | Swenson | 408/59 |

Primary Examiner—Z. R. Bilinsky
Assistant Examiner—Thomas M. Kline
Attorney, Agent, or Firm—Burns, Doane, Swecker & Mathis

[57] ABSTRACT

A retractable rotary cutting tool is disclosed in which the tool is adapted to be connected to a chuck or a tool holder of a machine tool such as an automobile tool changer on a numerically controlled machining center or the like. The cutting tool support is arranged to have a cutter which is recessed into the support and is pivotally connected to an actuating shaft coaxially within the tool support, which shaft reciprocates relative to the tool support when a thrust collar located about the tool support engages the work or another fixed external surface and will withdraw when the thrust collar engages for a second time an external surface or the work.

5 Claims, 6 Drawing Figures

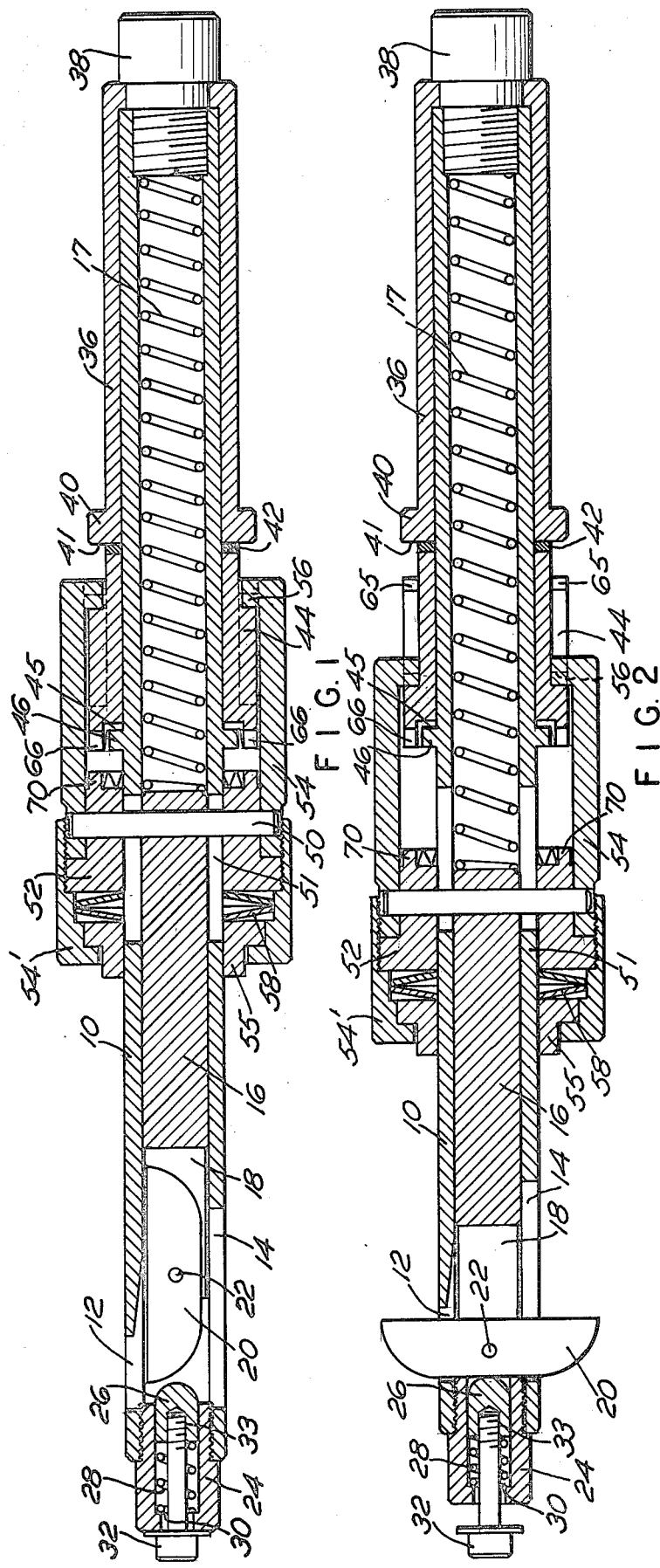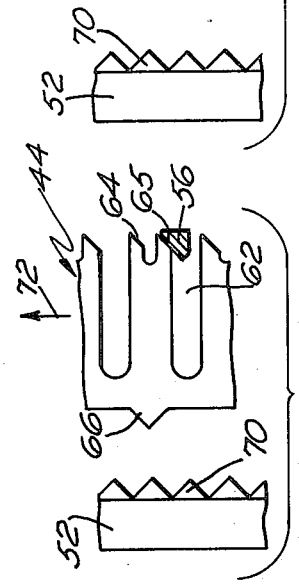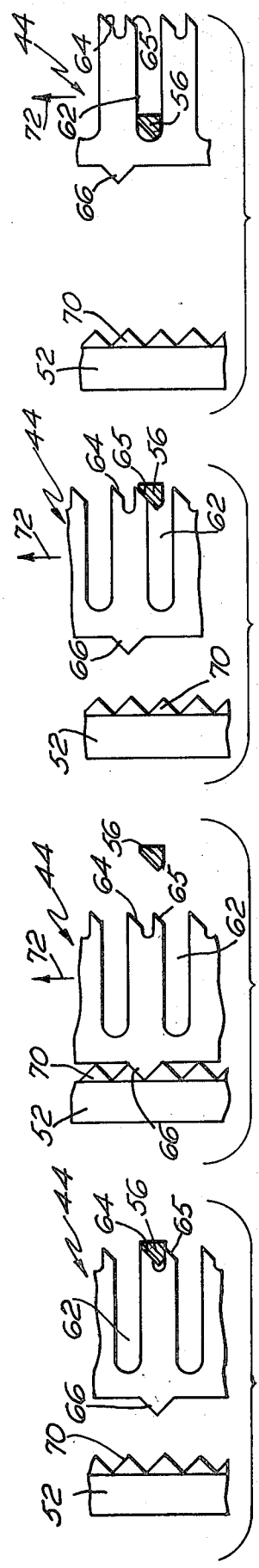

RETRACTABLE ROTARY CUTTING TOOL

BACKGROUND OF THE INVENTION

In their most familiar form, rotary cutting tools of the type disclosed in the instant application are known in the trade as backspot-facing tools, although with slight modification, the tool could be made to operate as an internal reaming device merely by changing the cutting edges to the outer periphery. Basically, the tools of this nature have taken two distinct forms; one form responsive to rearward and forward rotation of the spindle causes a cutter to extend outwardly by centrifugal force and perform a cutting operation, as seen for example in the Johansson patent, U.S. Pat. No. 3,540,324. In addition, there have been positively actuated cutters which move inwardly and outwardly in response to reciprocal movement of an actuating rod and are connected to an air motor as for example, seen in the MacDonald patent, U.S. Pat. No. 3,572,182. Other more simplified forms utilizing the principle of engagement of a stop collar are seen, as for example, in the Winberry U.S. Pat. No. 3,008,360. One of the problems presented by some of the tools of the prior art is that they do not adapt themselves well to automated maching operations and quick change tool holders or have the ability to be properly programmed into an automated operation.

SUMMARY OF THE INVENTION

According to the present invention, all of the parts in the rotary cutting tool are arranged about a central rotative axis so that there will be no chance for any run-out by the rotation of unbalanced masses. The rotary cutting tool is essentially a tool support in which a backspot-facing blade or cutting blade is pivotally supported and is moved in and out of a recess in the support by means of a central coaxial shaft which moves the blade about cam surfaces within the recess to bring the blade into open condition and in reverse direction to retract the blade fully within the support. The actuation of the shaft is completely mechanical and is responsive to a thrust collar engaging the work or an external abutment. The thrust collar is arranged with an impact absorbing, thrust plate at one engaging surface and at the other end the collar has axially extending teeth that cooperate with an indexing sleeve. The indexing sleeve which is free to revolve about the tool support, has teeth and cam slots therein into which a cam pin of the thrust collar rides that is coupled directly to the actuating shaft. The arrangement is such that as the thrust collar engages an external surface, the teeth engage the indexing sleeve teeth, that are not in registration, and move the same a finite rotative amount which in turn allows the cam pin to fall into a deep cam slot and allows the thrust collar through its coupling to the actuating shaft and urgance of spring pressure, to move and extend the blade. For reverse movement the thrust collar again engages the actuating collar and the teeth rotate the indexing collar as the actuating collar moves rearwardly so that the indexing collar having now moved into a different position presents a new position for the engagement of the cam pin to maintain the shaft and the blade in retracted position within the tool support.

BRIEF DESCRIPTION OF THE DRAWINGS

FIG. 1 is a longitudinal elevational view of the tool of this invention in which the blade is retracted;

FIG. 2 is a similar view with the blade extended;

FIGS. 3 to 6 are diagrammatic surface development views illustrating the manner in which the actuating collar and the indexing sleeve interrelate to move the blade in and out of the tool support.

DESCRIPTION OF THE PREFERRED EMBODIMENT

Referring to FIG. 1, a tubular tool support 10 is provided with a pair of diametrical slots 12 and 14 at the operative end thereof through which a cutter blade, as will appear hereinafter, may be projected. Slidably mounted within the tubular support 10 is an actuating shaft 16 which shaft is bifurcated as at 18 and into the slot of the bifurcated end at 18 a cutting tool 20 is mounted by means of a pin 22. Shaft 16 is normally urged to the left as seen in the drawing by compression spring 17. At the end of the tubular support there is threadingly received a plug 24 which carries a pivot button or cam 26 that is urged outwardly of the plug by a spring 28 acting against an abutment lip 30 and being held within the plug by a cap screw 32 that threadingly engages the button as at 33.

At the other end of the tool body, a drive shank 36 encircles the support and is held in position by a cap screw 38. The drive shank 36 terminates in a collar 40 which provides an end surface 41. Surrounding the tool support and located adjacent the end surface 41 is a washer 42 that abuts an indexing sleeve 44 that surrounds the tool support. The indexing sleeve is held in position by abutting against a washer 45 that in turn rides against the surface of a raised boss 46 of the tool support 10. In this way it will be seen that the indexing sleeve 440 is held in an axial positive position. The support 10 and the indexing sleeve 44 define a body for guarding the motion of a carrier for the tool as will be hereinafter explained.

The inner end of the actuating shaft 16 is provided with a radially extending pin 50 that passes through a slot 51 in the tool support 10. Pin 50 is connected to a thrust collar 52 that has a housing 54 also connected thereto that in turn has integral radially inwardly directed cam pins 56 that are adapted to engage cam slots in the indexing sleeve 44 as hereinafter appear. The collar 52, the housing 54, 56, and the shaft 16 define a carrier for the cutter. A thrust plate 55 rides on support 10 and is held away from thrust collar 52 by a compression spring 58, the plate 55 being held in position by a retainer 54' threaded onto housing 54.

By referring now to FIGS. 3-6 of the drawings for a better understanding of the actuation collar 52 and the indexing sleeve 44, it should be noted that the indexing sleeve 44 is provided with a plurality of axially extending deep cam slots such as 62 and a second set of cam slots as at 64 which are on the end of the sleeve. In addition, the opposite end of the sleeve is provided with an even number of teeth 66 which extend toward the actuation collar 52 that is provided with a plurality of teeth indicated generally as 70. By referring to the flat layout of the teeth, it will be noted that in effect, the teeth 66, of which there may be four at 90° to each other, are arranged in a particular fashion relative to the cam slots so that as the teeth 70 come toward the teeth 66, there will always be created rotative movement of the sleeve 44.

To understand this rotative movement, FIGS. 3-6 show the sequence of operations. The developed layout of FIG. 3 illustrates the position of the parts as shown in FIG. 1 of the drawings where the cam pin 56 is engaged in the slot 64, i.e., aligned abutments on the cam pin 56 and the sleeve 44 engage to prevent relative longitudinal movement between the body and carrier in a first direction which would move the cutter outwardly. As the thrust collar 52 is moved to the right as seen in the drawing, FIG. 4 illustrates the fact that the teeth 70 have engaged teeth 66, and because of the offset as seen in FIG. 3 the indexing sleeve 44 has been displaced in the direction of the arrow 72. This now places the caming pin 56 in a postion as seen in FIG. 5, where it is aligned with the surface 65, and as it engages the surface 65 as shown in FIG. 5 it will slide off that surface and into the slot 62 as seen in FIG. 6. As will be apparent, this has now allowed the housing 54 to move to the left, as seen in the drawing along with its thrust collar 52 and in turn pin 50 has moved the actuating shaft 16 to the left so that the arcuate surface of the blade 20 would have engaged the cam button 26 and swung outwardly through the slots 12 and 14, and then down, seating against the plug 24. Further, as can be seen from FIG. 6, as the thrust collar 52 is again urged to the right, a cam 65A on the tool body swings the cutter inwardly; also the alignment of teeth 70 and the teeth 66 is such to again cause rotation of the indexing sleeve 44 and this will cause the cam pin 56 to be displaced out of alignment with the slot 62 and fall down into the slot 64 whereupon the cycle can be repeated.

I claim:

1. A retractable rotary cutting tool having a tool body, carrier means mounted to said body for movement relative thereto in the longitudinal direction of the tool body, a cutter mounted on said carrier means for radial movement between inward and outward positions, first camming means on said tool body for camming said cutter radially outwardly in response to relative longitudinal movement between said body and carrier means in a first direction, first abutment means on said body normally engaging second abutment means on said carrier means to prevent said relative longitudinal movement in said first direction, said body and carrier being relatively longitudinally movable in a second direction opposite said first direction in response to pushing of said carrier means against a stop, displacement means responsive to said relative longitudinal movement in said second direction with said cutter in an inward position to relatively move said first and second abutment means out of alignment and permit said relative longitudinal movement in said first direction wherein said cutter moves to said outward position, second camming means on said body for swinging said cutter to said inward position in reponse to said relative longitudinal movement between said body and carrier means in said second direction when said cutter is in an outward position, said displacement means being responsive to said relative longitudinal movement in said second direction as said cutter is being moved to an inward position to relatively move said first and second abutment means into alignment and prevent said relative longitudinal movement in said first direction after said cutter has reached said inward position.

2. A retractable rotary cutting tool having a tool body which includes a hollow support and an indexing sleeve extending therearound, carrier means mounted on said body for movement relative thereto in the longitudinal direction of the tool body, said carrier means including an actuating shaft disposed slidably within said support, a cutter mounted on said actuating shaft within said support for radial movement between inward and outward positions, said carrier means comprising a slidable thrust collar having axially extending first teeth on one end thereof, said indexing sleeve being freely rotatable about said support and having axially extending second teeth adapted to engage said first teeth to rotate said indexing sleeve, said indexing sleeve having longitudinally extending cam slots open at the end of said indexing sleeve opposite said first teeth, said carrier means including cam means arranged to enter said slots when aligned therewith in order to enable said cutter to be moved to its outward position, and means normally urging said actuating shaft in a position to extend said cutter.

3. A retractable rotary cutting tool as defined in claim 2, wherein said carrier means includes a housing attached to said thrust collar and containing said cam means.

4. A retractable rotary cutting tool as defined in claim 2, wherein said means urging said shaft comprises a compression spring acting against an end of said shaft.

5. A retractable cutting tool as defined in claim 2, wherein said second teeth are positioned to be out of register with said first teeth when said cam means is disposed in said slots whereby the sleeve is rotated upon each engagement of said second teeth by said first teeth.

* * * * *